(12) United States Patent
Kim et al.

(10) Patent No.: US 8,213,263 B2
(45) Date of Patent: Jul. 3, 2012

(54) APPARATUS AND METHOD OF DETECTING TARGET SOUND

(75) Inventors: Kyu-hong Kim, Suwon-si (KR); Kwang-cheol Oh, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 12/469,557

(22) Filed: May 20, 2009

(65) Prior Publication Data
US 2010/0110834 A1 May 6, 2010

(30) Foreign Application Priority Data
Oct. 30, 2008 (KR) .................. 10-2008-0107061

(51) Int. Cl.
*G01S 3/80* (2006.01)
(52) U.S. Cl. ......... 367/125; 367/118; 367/124; 181/125
(58) Field of Classification Search .................. 367/118, 367/124, 125; 181/125
See application file for complete search history.

(56) References Cited

U.S. PATENT DOCUMENTS

| | | | | |
|---|---|---|---|---|
| 3,947,803 A * | 3/1976 | Brown | ......................... | 367/125 |
| 4,208,735 A * | 6/1980 | Suzuki et al. | ................. | 367/136 |
| 4,558,439 A * | 12/1985 | Gu/ desen | .................... | 367/127 |
| 4,910,719 A * | 3/1990 | Thubert | ........................ | 367/125 |
| 5,161,127 A * | 11/1992 | Grosch | ......................... | 367/124 |
| 5,943,427 A * | 8/1999 | Massie et al. | .................. | 381/17 |
| 6,009,396 A * | 12/1999 | Nagata | ......................... | 704/270 |
| 6,198,693 B1 * | 3/2001 | Marash | ......................... | 367/125 |
| 7,957,225 B2 * | 6/2011 | Steadman | ..................... | 367/124 |
| 2002/0097885 A1 * | 7/2002 | Birchfield et al. | ............... | 381/92 |
| 2002/0167862 A1 * | 11/2002 | Tomasi et al. | ................. | 367/118 |
| 2003/0039369 A1 * | 2/2003 | Bullen | ........................ | 381/71.12 |
| 2007/0230725 A1 * | 10/2007 | Wang | ............................ | 381/309 |
| 2008/0025477 A1 * | 1/2008 | Farhan | ............................ | 379/38 |
| 2008/0071532 A1 * | 3/2008 | Ramakrishnan et al. | ..... | 704/233 |
| 2008/0077403 A1 * | 3/2008 | Hayakawa | .................... | 704/233 |
| 2008/0181058 A1 * | 7/2008 | Hayakawa | .................... | 367/125 |

FOREIGN PATENT DOCUMENTS
EP    1887831 A2 *   2/2008
(Continued)

OTHER PUBLICATIONS

Jong Won Shin, Joon-Hyuk Chang, Nam Soo Kim, "Voice activity detection based on a family of parametric distributions" Pattern Recognition Letters, vol. 28, Issue 11, Advances on Pattern recognition for speech and audio processing, Aug. 1, 2007, pp. 1295-1299.*

(Continued)

*Primary Examiner* — Jack W Keith
*Assistant Examiner* — James Hulka
(74) *Attorney, Agent, or Firm* — NSIP Law

(57) ABSTRACT

An apparatus and method of voice activity detection (VAD) are disclosed. To detect a target sound, a target sound detecting apparatus calculates the phase difference corresponding to each frequency component from a plurality of sound signals converted in frequency domain, calculates a characteristic value indicating possibility that the phase difference of the frequency component is within an allowable phase difference range of target sound calculated based on a direction angle of the target sound, and detects the presence and/or absence of target sound using the characteristic value.

19 Claims, 3 Drawing Sheets

FOREIGN PATENT DOCUMENTS

| | | |
|---|---|---|
| EP | 1953734 A2 * | 8/2008 |
| JP | 62-133895 | 6/1987 |
| JP | 63-262576 | 10/1988 |
| JP | 2001-356157 | 12/2001 |
| JP | 2003-337164 | 11/2003 |
| JP | 2007-183202 | 7/2007 |
| KR | 10-2004-0079085 | 9/2004 |
| KR | 10-2008-0013734 | 2/2008 |

OTHER PUBLICATIONS

Davis, A.; Nordholm, S.; Togneri, R.; , "Statistical voice activity detection using low-variance spectrum estimation and an adaptive threshold," Audio, Speech, and Language Processing, IEEE Transactions on , vol. 14, No. 2, pp. 412-424, Mar. 2006.*

Kawanishi, M.; Maruta, R.; Ikoma, N.; Kawano, H.; Maeda, H.; , "Sound target tracking in 3D using particle filter with 4 microphones," SICE, 2007 Annual Conference , vol., No., pp. 1427-1430, Sep. 17-20, 2007.*

Eric A. Lehmann and Anders M. Johansson. 2007. "Particle filter with integrated voice activity detection for acoustic source tracking". EURASIP J. Appl. Signal Process. 2007, Jan. 1, 2007.*

Russell Braunling, Randy M. Jensen and Michael A. Gallo, "Acoustic target detection, tracking, classification, and location in a multiple-target environment", Proc. SPIE 3081, 57, 1997.*

Quach, A.; Lo, K.; , "Automatic target detection using a ground-based passive acoustic sensor," Information, Decision and Control, 1999. IDC 99. Proceedings. 1999 , vol., No., pp. 187-192, 1999.*

* cited by examiner

APPARATUS AND METHOD OF DETECTING TARGET SOUND

CROSS-REFERENCE TO RELATED APPLICATION(S)

This application claims the benefit under 35 U.S.C. §119 (a) of Korean Patent Application No. 10-2008-00107061, filed on Oct. 30, 2008, the disclosure of which is incorporated herein in its entirety by reference.

BACKGROUND

1. Field

The following description relates to digital signal processing, and more particularly, to an apparatus and method of detecting a sound source at an arbitrary location.

2. Description of the Related Art

Voice activity detection (VAD) or sound source detection is useful in performing signal processing, and can greatly affect system performance. The VAD can improve the performances of systems in various applications, such as sound encoding, multimedia (sound and data) communications, speech enhancement in noisy environments, voice recognition, etc. The VAD detects a presence and/or absence of voice signals at regular intervals, thus determining whether or not a voice is heard at every predetermined interval. Generally, the VAD detects the presence and/or absence of voice signals using magnitude values of the frequency spectrums of input signals, such as energy of voice signals, Zero Crossing Rate (ZCR), Level Crossing Rate (LCR), Signal to Noise Ratio (SNR), the statistical distribution of frequency components, etc.

SUMMARY

One general aspect includes an apparatus to detect a target sound based on each sound signal acquired by a plurality of acoustic sensors, including a frequency converter to convert the sound signal into an frequency input signal, a phase difference calculator to calculate a phase difference corresponding to each frequency component using the frequency input signal, a characteristic value extractor to extract a characteristic value indicating a possibility that the phase difference corresponding to the frequency component is within an allowable phase difference range of target sound determined based on a direction angle of the target sound, and a determining unit to compare the characteristic value to a threshold characteristic value, so as to determine whether the target sound exists in the sound signal according to the result of the comparison.

The frequency converter may segment the sound signal into a plurality of frames, and converts the plurality of frames into the frequency input signal in units of frames.

The characteristic value extractor may calculate the allowable phase difference range of target sound based on an allowable angle range of target sound including the direction angle of target sound.

The characteristic value may be calculated using the number of phase differences of frequency components included in the allowable phase difference range of the target sound.

The characteristic value may be an average number of valid frequency components obtained by dividing the number of frequency components included in the allowable phase difference range of the target sound by a total number of frequency components of the frequency input signal.

The apparatus may further include a target sound extractor to extract the target sound from the sound signal using the result of the determination.

The direction angle of the target sound and the allowable angle range of the target sound including the direction angle of the target sound may be adjustable.

According to another general aspect, there is provided a method of detecting target sound based on each sound signal acquired by a plurality of acoustic sensors, including converting the sound signal into an frequency input signal, calculating a phase difference corresponding to each frequency component of the frequency input signal, obtaining an allowable phase difference range of target sound, based on a direction angle of the target sound and an allowable angle range of the target sound including the direction angle of the target sound, extracting a characteristic value indicating possibility that the phase difference corresponding to the frequency component is within an allowable phase difference range of the target sound, and comparing the characteristic value to a threshold characteristic value, so as to determine whether the target sound exists in the sound signal according to the result of the comparison.

The converting of the sound signal into the frequency input signal may include segmenting the sound signal into a plurality of frames, and converting the plurality of frames into the frequency input signal in units of frames.

The characteristic value may be calculated using the number of phase difference of frequency components included in the allowable phase difference range of the target sound.

The characteristic value may be an average number of valid frequency components obtained by dividing the number of frequency components included in the allowable phase difference range of the target sound by a total number of frequency components of the frequency input signal.

The method may further include extracting the target sound from the sound signal, based on the result of the determination.

The direction angle of the target sound and the allowable angle range of the target sound including the direction angle of target sound may be adjustable.

The sound signal may satisfy a far-field condition that the sound source is far away from the plurality of sensors.

Other features and aspects will be apparent from the following detailed description, the drawings, and the claims.

Figure 1:
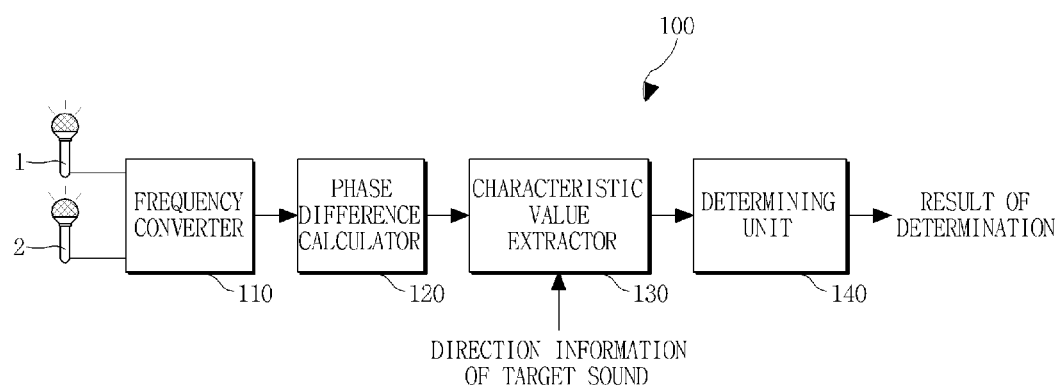
FIG. 1 is a block diagram illustrating an exemplary target sound detecting apparatus.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a block diagram illustrating and exemplary target sound detecting apparatus 100.

Referring to FIG. 1, the target sound detecting apparatus 100 includes a first acoustic sensor 1, a second acoustic sensor 2, a frequency converter 110, a phase difference calculator 120, a characteristic value extractor 130, and a determining unit 140.

The first and second acoustic sensors 1 and 2 may be microphones to receive sound. Each of the first and second acoustic sensors 1 and 2 may include an amplifier, an A/D converter, etc., and converts sound signals to electrical signals. While FIG. 1 illustrates only two acoustic sensors (1 and 2), the target sound detecting apparatus 100 may include three or more acoustic sensors.

The frequency converter 110 receives sound signals in a time domain, and converts the sound signals into frequency input signals in a frequency domain. For example, the frequency converter 110 can convert sound signals in a time domain into frequency input signals in a frequency domain, using Discrete Fourier Transform (DFT) or Fast Fourier Transform (FFT).

In detail, the frequency converter 110 segments a received sound signal into a plurality of frames, and converts each sound signal frame into a frequency input signal in a frequency domain. In order to obtain stable spectrums, each sound signal frame is multiplied by a time window such as a hamming window. A length of a frame is set to a proper value in consideration of a sampling frequency, the type of the corresponding application, etc.

In response to a first sound signal being input to the first acoustic sensor 1 is $x_1(t)$ and a second sound signal being input to the second acoustic sensor 2 is $x_2(t)$, a first frequency input signal obtained by frequency-converting a frame with a predetermined length in the first sound signal $x_1(t)$ can be expressed by $x_1(n, m)$ and a second frequency input signal obtained by frequency-converting a frame with a predetermined length in the second sound signal $x_2(t)$ can be expressed by $x_2(n, m)$, where n is a frame index and m is a frequency index.

Then, the phase difference calculator 120 calculates the phase differences corresponding to frequency components from the first and second frequency input signals $x_1(n, m)$ and $x_2(n, m)$. In detail, the phase difference calculator 120 extracts the phase component corresponding to each frequency from the sound signals $x_1(t)$ and $x_2(t)$ received in units of frames, and then calculates the phase difference for each phase component. The phase difference corresponding to the frequency components includes differences between frequency phase components, which are calculated from analysis frames between channels.

In detail, the first frequency input signal $x_1(n, m)$ may be defined as the m-th frequency of the n-th frame of a signal (also referred to as a first channel input signal) obtained by frequency-converting the first sound signal $x_1(t)$ input to the first acoustic sensor 1. The first frequency input signal $x_1(n, m)$ may be expressed as Equation 1, and the phase of $x_1(n, m)$ may be expressed as Equation 2.

The second frequency input signal $x_2(n, m)$ may also be expressed in the same manner.

$$x_1(n, m) = a + jb \quad \text{[Equation 1]}$$

$$\angle x_1(n, m) = \tan^{-1}\frac{b}{a} \quad \text{[Equation 2]}$$

The characteristic value extractor 130 extracts a characteristic value corresponding to the number of the phase differences corresponding to frequency components that are within an allowable phase difference range of target sound, wherein the allowable phase difference range depends on a direction angle of the target sound. The characteristic value extractor 130 may extract frequency components which are received in a target direction, from among the entire frequency components of the first and second sound signals $x_1(t)$ and $x_2(t)$, using the phase differences of the frequency components between the first sound signal $x_1(t)$ and the second sound signal $x_2(t)$.

The determining unit 140 compares the characteristic value to a threshold characteristic value, thus detecting the presence and/or absence of the target sound. The threshold characteristic value is from "0" to "1," or can be set to a proper value through experiment. That is, the threshold characteristic value may be set to a proper value according to risks corresponding to "False Alarm" and "False Rejection" upon detection of target sound. The process of extracting the characteristic value to detect the presence and/or absence of the target sound will be described in detail later.

According to an embodiment, the target sound detecting apparatus 100 may further include a target sound extractor (not illustrated) to extract a target sound from analysis frames. In response to the target sound detecting apparatus 100 determining that target sound exists in the analysis frames, the target sound detecting apparatus 100 amplifies the input signal corresponding to the analysis frames, and in response to no target sound existing, the target sound detecting apparatus 100 attenuates the input signal corresponding to the analysis frames.

Figure 2:
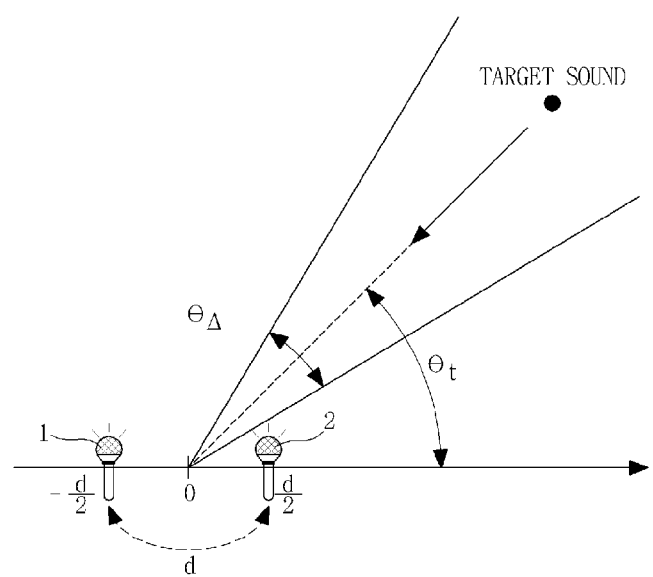
FIG. 2 is a view illustrating a target sound being extracted using two acoustic sensors.

FIG. 2 is a view illustrating a target sound being extracted using two acoustic sensors.

Referring to FIG. 2, it is assumed that acoustic sensors 1 and 2 (i.e., two microphones) are spaced by a distance d. Accordingly, a far-field condition is satisfied such that a target sound (i.e., a sound source) is far away from the microphones, and the target sound is positioned in the direction of $\theta_t$. That is, the sound signal has a magnitude of sound pressure and a phase of sound satisfying the far-field condition. In this case, first and second microphone signals $x_1(t, r)$ and $x_2(t, r)$ which are propagated at a time t within a space r may be defined as Equations 3 and 4.

$$X_1(t, r) = Ae^{j\left\{wt - \frac{2\pi}{\lambda}\cos\theta_t\left(-\frac{d}{2}\right)\right\}} \quad \text{[Equation 3]}$$

$$X_2(t, r) = Ae^{j\left\{wt - \frac{2\pi}{\lambda}\cos\theta_t\left(\frac{d}{2}\right)\right\}}, \quad \text{[Equation 4]}$$

where r represents a space coordinate, $\theta_t$ represents a direction angle of the sound, and $\lambda$ represents the wavelength of the sound.

In this case, the phase difference between the first and second microphone signals $x_1(t, r)$ and $x_2(t, r)$ may be calculated as follows in Equation 5.

$$\Delta P = \angle x_1(t,r) - \angle x_2(t,r) = \frac{2\pi}{\lambda}d\cos\theta_t = \frac{2\pi f}{c}d\cos\theta_t, \quad \text{[Equation 5]}$$

where c is the speed (330 m/s) of the sound wave, and f is its frequency.

Accordingly, if it is assumed that the direction angle $\theta_t$ of the sound is the direction angle $\theta_t$ of the target sound, the phase difference ΔP corresponding to each frequency component may be calculated using the above Equation 5.

A sound signal propagated at the direction angle $\theta_t$ from a specific location may have a different phase difference ΔP according to its frequency.

Meanwhile, an allowable angle range $\theta_\Delta$ of the target sound including the direction angle $\theta_t$ of the target sound may be set to a proper range in consideration of the influence of noise. For example, in response to the direction angle $\theta_t$ of the target sound being π/2, an angle range between about 5π/12 and about 7π/12 may be set to the allowable angle range $\theta_\Delta$ of the target sound in consideration of the influence of noise.

If the direction angle $\theta_t$ of the target sound is given and the allowable angle range $\theta_\Delta$ of the target sound is set to a proper range, an allowable phase difference range of the target sound may be calculated using the above Equation 5.

Figure 3:
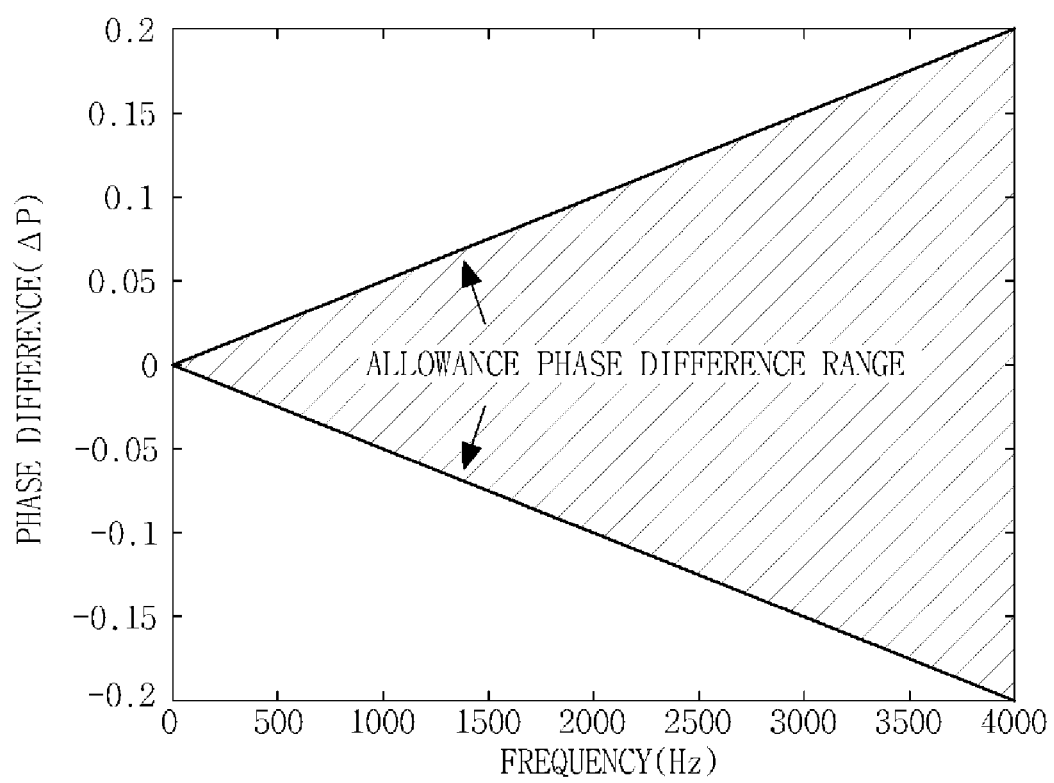
FIG. 3 is a graph illustrating an allowable phase difference range of a target sound with respect to a frequency of the target sound.

FIG. 3 is a graph illustrating an allowable phase difference range of target sound with respect to the frequency of the target sound.

More specifically, FIG. 3 is a graph illustrating phase differences ΔP to frequency components, where the direction angle $\theta_t$ of the target sound is π/2 and an allowable angle range $\theta_\Delta$ of the target sound is set to between about 5π/12 and about 7π/12 in consideration of the influence of noise, as in the above-described example. For example, in response to a phase difference calculated at a frequency of 2000 Hz of a currently received sound signal frame being between about −0.1 and about 0.1, the phase difference remains within the allowable phase difference range. Also, referring to FIG. 3, the allowable phase difference range is widened as the frequency of the received signal increases.

In consideration of the relationship between the allowable angle range of target sound and the allowable phase difference range of the target sound, in response to a phase difference ΔP at a predetermined frequency of a currently received sound signal being within the allowable phase difference range of target sound, it is determined that the target sound exists within the received signal. Otherwise, in response to the phase difference ΔP at the frequency not being within the allowable phase difference range, it is determined that no target sound exists within the received signal.

According to an embodiment, a characteristic value of a frequency component may be obtained by assigning a predetermined weight to the frequency component where a phase difference of the frequency component is included in the allowable phase difference range of target sound. For example, a binary function to detect the presence and/or absence of target sound may be defined as Equation 6.

$$F_b(m) = \begin{cases} 1, & Th_L(m) < \Delta P(m) < Th_H(m) \\ 0, & \text{otherwise,} \end{cases} \quad \text{[Equation 6]}$$

where ΔP(m) represents a phase difference corresponding to the m-th frequency of an input signal, and $Th_L(m)$ and $Th_H(m)$ respectively represent the lowest and highest threshold values in an allowable phase difference range of target sound corresponding to the m-th frequency.

Here, $Th_L(m)$ and $Th_H(m)$ may be defined as Equations 7 and 8, respectively.

$$Th_L(m) = \frac{2\pi f}{c}d\cos\left(\theta_t + \frac{\theta_\Delta}{2}\right) \quad \text{[Equation 7]}$$

$$Th_H(m) = \frac{2\pi f}{c}d\cos\left(\theta_t - \frac{\theta_\Delta}{2}\right) \quad \text{[Equation 8]}$$

Accordingly, the lowest and highest threshold values $Th_L(m)$ and $Th_H(m)$ in the allowable phase difference range of the target sound may be changed depending on the allowable angle range $\theta_\Delta$ of the target sound.

Here, the relationship between the frequency f and frequency index m may be approximately expressed by Equation 9.

$$f = \frac{m \cdot f_s}{N_{FFT}}, \quad \text{[Equation 9]}$$

where $N_{FFT}$ represents a FFT sample size, and $f_s$ represents a sampling frequency. Equation 9 illustrates the approximate relationship between the frequency f and frequency index m, and accordingly the approximate relationship between the frequency f and frequency index m may be expressed in various ways.

Again returning to FIG. 1, as described above, the allowable phase difference range of the target sound may be calculated by the characteristic value extractor 130 by using the direction angle $\theta_t$ of the target sound and the allowable angle range $\theta_\Delta$ of the target sound. Or, a predetermined storage in which allowable phase difference ranges are stored in correspondence to the directions and allowable angles of target sounds may be provided in the characteristic value extractor 130.

According to an embodiment, the characteristic value extractor 130, as illustrated by the above Equation 9, may calculate a characteristic value indicating the possibility that a phase difference corresponding to each frequency component will be within an allowable phase difference range of target sound determined based on an allowable angle range $\theta_\Delta$ of the target sound, using the number of the phase differences of frequency components included in the allowable phase difference range. Also, the characteristic value may be represented by an average number of valid frequency components obtained by dividing the number of frequency components being within the allowable phase difference range of target sound by a total number M of frequency components of the received frequency input signal. That is, the characteristic value may be expressed as B(n) by Equation 10, using Equation 9.

$$B(n) = \frac{1}{M}\sum_{m=1}^{M} F_b(m) \quad \text{[Equation 10]}$$

Meanwhile, as illustrated in FIG. 3, where the allowable phase difference range of target sound is too narrow at a very high frequency area and too wide at a very high frequency area, detection of the presence of target sound only according to whether a measured phase difference is included in the allowable phase difference range of the target sound may be incorrect. Accordingly, where the number of valid frequency components is calculated using the above Equation 10, only phase difference values at middle frequencies can be used while excluding phase difference values at very high or low frequencies. Additionally, there is a method of excluding phase difference values for frequency components having low amplitudes (or low energy) by using a mean (not illustrated) of calculating an amplitude component (e.g., $\sqrt{a^2+b^2}$ in the frequency input signal of Equation 1) corresponding to each frequency. That is, the characteristic value may be calculated in various ways.

According to an embodiment, where a characteristic value of a frequency component is calculated using Equation 10, the determining unit 140 may determine that an existence possibility of a target sound component in an analysis frame increases as B(n) approximates "1," and the existence possibility of the target sound component in the analysis frame decreases as B(n) approximates "0."

According to an embodiment, the determining unit 140 may determine that target sound exists in an analysis frame where B(n) exceeds a predetermined threshold value and that no target sound exists and only noise exists in the analysis frame where the B(n) is below the predetermined threshold value. This may be expressed by Equation 11.

$$\text{Result}(n) = \begin{cases} \text{target sound} + \text{noise}, & \text{if } B(n) \geq \text{threshold value} \\ \text{noise}, & \text{otherwise} \end{cases} \quad [\text{Equation 11}]$$

Meanwhile, where sound signals are received from a plurality of acoustic sensors, for example, from three acoustic sensors, the phase differences corresponding to three frequency components may be calculated. In this case, according to the above-described method, three characteristic values corresponding to the three frequency components are calculated, an average value of the characteristic values is calculated by an arbitrary method of averaging characteristic values, then the average value of the characteristic values is compared with a threshold characteristic value, and the presence and/or absence of the target sound is determined according to the result of the comparison.

According to an exemplary target sound detecting apparatus described above, since target sound is detected from received sound signals using only phase information of the sound signals without using features based on the energy of the sound signals, the target sound detecting apparatus may not require gain calibration of microphones that receive the sound and be robust against noise. Also, since the target sound detecting apparatus may be installed and operated in a very small-sized microphone array, the target sound detecting apparatus may effectively detect target sound even in a small-sized apparatus where microphones are spaced at narrow intervals. Also, since only phase information is used to determine the presence and/or absence of sound propagated in a specific direction, various kinds of target sound such as music may be detected. Accordingly, the target sound detecting apparatus may be applied to various fields such as motion capture, in which microphones may be used, compared to conventional sound detecting technologies.

Figure 4:
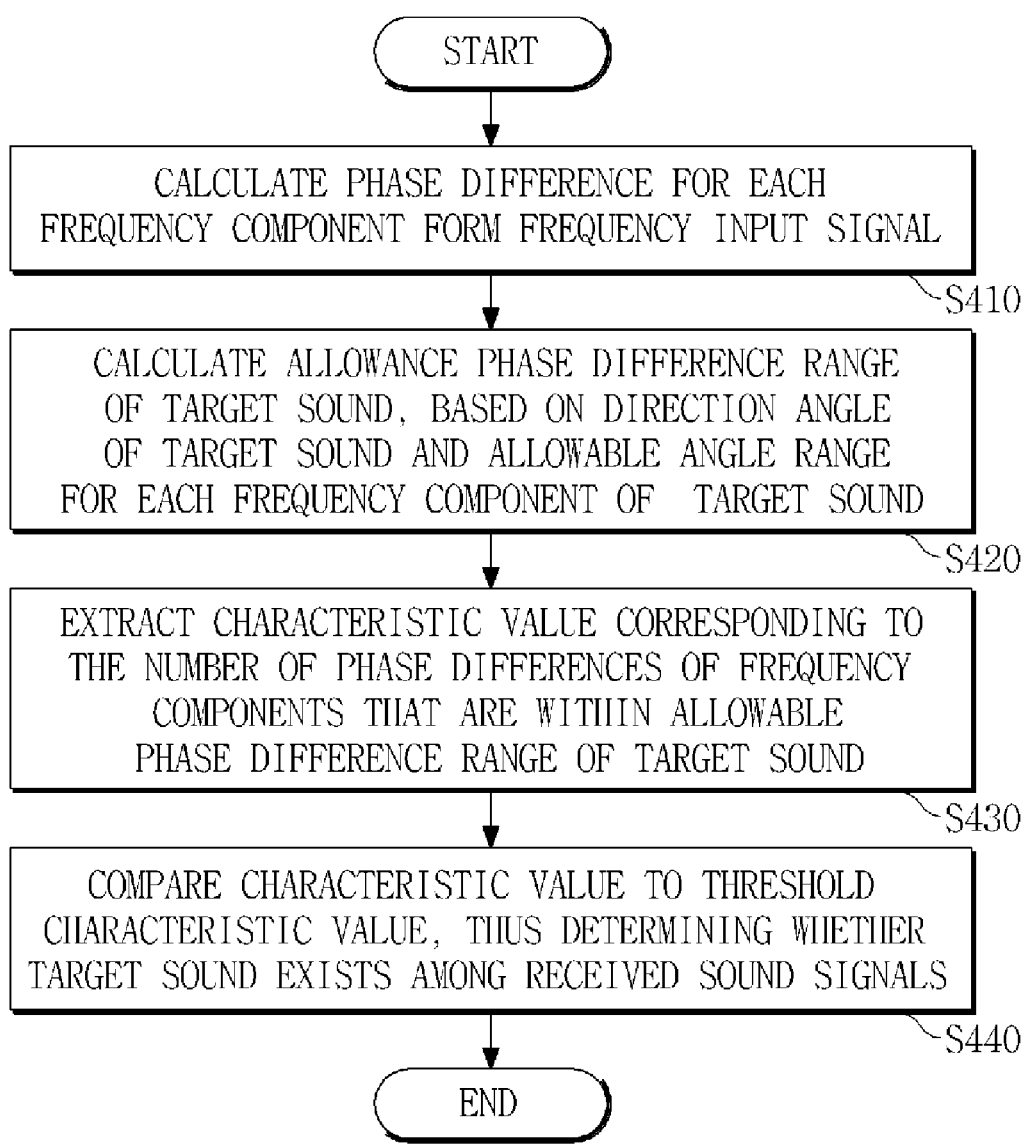
FIG. 4 is a flowchart of an exemplary target sound detecting method.

FIG. 4 is a flowchart illustrating an exemplary target sound detecting method.

Referring to FIGS. 1 and 4, the phase difference calculator 120 calculates a phase difference corresponding to each frequency component of frequency input signals obtained by frequency-converting sound signals acquired from a plurality of acoustic sensors in operation S410.

The characteristic value extractor 130 calculates an allowable phase difference range of target sound, using a direction angle $\theta_t$ of the target sound and an allowable angle range corresponding to each frequency component of the target sound in operation S420. The allowable phase difference range may be stored in advance in the target sound detecting apparatus 100.

In operation S430, the characteristic value extractor 130 extracts a characteristic value indicating the possibility that the phase difference corresponding to each frequency component will be within the allowable phase difference range of the target sound. The characteristic value can be calculated using the number of the phase differences of frequency components included in the allowable phase difference range. For example, the characteristic value may be an average number of valid frequency components obtained by dividing the number of frequency components included in the allowable phase difference range of the target sound by a total number M of frequency components of the frequency input signal.

In operation S440, the determining unit 140 compares the characteristic value to a threshold characteristic value, thus determining whether the target sound exists among the received sound signals according to the result of the comparison.

The direction angle $\theta_t$ of the target sound can be received from the outside, in various ways, for example, through manipulation of a user interface. The allowable direction range including the direction angle $\theta_t$ can also be changed through manipulation.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus configured to detect a target sound based on each sound signal acquired by a plurality of acoustic sensors, comprising:
 a frequency converter configured to convert the sound signal into a frequency input signal;
 a phase difference calculator configured to calculate a phase difference corresponding to each frequency component using the frequency input signal;
 a characteristic value extractor configured to extract a characteristic value indicating a possibility that the phase difference corresponding to the frequency component is within an allowable phase difference range of target sound determined based on a direction angle of the target sound; and
 a determining unit configured to compare the characteristic value to a threshold characteristic value, so as to determine whether the target sound exists in the sound signal according to the result of the comparison.

2. The apparatus of claim 1, wherein the frequency converter segments the sound signal into a plurality of frames, and converts the plurality of frames into the frequency input signal in units of frames.

3. The apparatus of claim 1, wherein the characteristic value extractor calculates the allowable phase difference range of target sound based on an allowable angle range of target sound including the direction angle of target sound.

4. The apparatus of claim 3, wherein the direction angle of the target sound and the allowable angle range of the target sound including the direction angle of the target sound are adjustable.

5. The apparatus of claim 1, wherein the characteristic value is calculated using the number of phase differences of frequency components included in the allowable phase difference range of the target sound.

6. The apparatus of claim 5, wherein the characteristic value is an average number of valid frequency components obtained by dividing the number of frequency components included in the allowable phase difference range of the target sound by a total number of frequency components of the frequency input signal.

7. The apparatus of claim 1, further comprising a target sound extractor configured to extract the target sound from the sound signal using the result of the determination.

8. The apparatus of claim 1, wherein the sound signal has a magnitude of sound pressure and a phase of sound satisfying a far-field condition.

9. The apparatus of claim 1, wherein the allowable phase difference range of target sound is bounded by a lowest threshold value and a highest threshold value, the lowest and highest threshold values respectively determined by the following equations:

$$Th_L(m) = \frac{2\pi f}{c} d\cos\left(\theta_t + \frac{\theta_\Delta}{2}\right); \text{ and} \quad \text{(i)}$$

$$Th_H(m) = \frac{2\pi f}{c} d\cos\left(\theta_t - \frac{\theta_\Delta}{2}\right); \quad \text{(ii)}$$

wherein $Th_L$ represents the lowest threshold value, $Th_H$ represents the highest threshold value, f represents frequency, c represents a speed of the sound signal, $\theta_t$ represents a direction angle of the target sound, $\theta_\Delta$ represents an allowable angle range of the target.

10. A method of detecting target sound based on each sound signal acquired by a plurality of acoustic sensors, the method comprising:
 converting the sound signal into an frequency input signal;
 calculating a phase difference corresponding to each frequency component of the frequency input signal;
 obtaining an allowable phase difference range of target sound, based on a direction angle of the target sound and an allowable angle range of the target sound including the direction angle of the target sound;
 extracting a characteristic value indicating a possibility that the phase difference corresponding to the frequency component is within an allowable phase difference range of the target sound; and
 comparing the characteristic value to a threshold characteristic value, so as to determine whether the target sound exists in the sound signal according to the result of the comparison.

11. The method of claim 10, wherein the converting of the sound signal into the frequency input signal comprises:
 segmenting the sound signal into a plurality of frames; and
 converting the plurality of frames into the frequency input signal in units of frames.

12. The method of claim 10, wherein the characteristic value is calculated using the number of phase difference of frequency components included in the allowable phase difference range of the target sound.

13. The method of claim 12, wherein the characteristic value is an average number of valid frequency components obtained by dividing the number of frequency components included in the allowable phase difference range of the target sound by a total number of frequency components of the frequency input signal.

14. The method of claim 10, further comprising:
 extracting the target sound from the sound signal, based on the result of the determination.

15. The method of claim 10, wherein the direction angle of the target sound and the allowable angle range of the target sound including the direction angle of target sound are adjustable.

16. The method of claim 10, wherein the sound signal satisfies a far-field condition that the sound source is far away from the plurality of sensors.

17. The method of claim 10, wherein the allowable phase difference range of target sound is bounded by a lowest threshold value and a highest threshold value, the lowest and highest threshold values respectively determined by the following equations:

$$Th_L(m) = \frac{2\pi f}{c} d\cos\left(\theta_t + \frac{\theta_\Delta}{2}\right); \text{ and} \quad \text{(i)}$$

$$Th_H(m) = \frac{2\pi f}{c} d\cos\left(\theta_t - \frac{\theta_\Delta}{2}\right); \quad \text{(ii)}$$

wherein $Th_L$ represents the lowest threshold value, $Th_H$ represents the highest threshold value, f represents frequency, c represents a speed of the sound signal, $\theta_t$ represents a direction angle of the target sound, $\theta_\Delta$ represents an allowable angle range of the target.

18. A non-transitory computer-readable storage medium configured to store a program to detect a target sound, comprising instructions to cause a computer to:
 convert the sound signal into a frequency input signal;
 calculate a phase difference corresponding to each frequency component of the frequency input signal;

obtain an allowable phase difference range of target sound, based on a direction angle of the target sound and an allowable angle range of the target sound including the direction angle of the target sound;

extract a characteristic value indicating a possibility that the phase difference corresponding to the frequency component is within an allowable phase difference range of the target sound; and compare the characteristic value to a threshold characteristic value, so as to determine whether the target sound exists in the sound signal according to the result of the comparison.

19. The computer-readable storage medium of claim 18, wherein the allowable phase difference range of target sound is bounded by a lowest threshold value and a highest threshold value, the lowest and highest threshold values respectively determined by the following equations:

$$Th_L(m) = \frac{2\pi f}{c} d\cos\left(\theta_t + \frac{\theta_\Delta}{2}\right); \text{ and} \quad (i)$$

$$Th_H(m) = \frac{2\pi f}{c} d\cos\left(\theta_t - \frac{\theta_\Delta}{2}\right); \quad (ii)$$

wherein $Th_L$ represents the lowest threshold value, $Th_H$ represents the highest threshold value, f represents frequency, c represents a speed of the sound signal, $\theta_t$ represents a direction angle of the target sound, $\theta_\Delta$ represents an allowable angle range of the target.

* * * * *